June 6, 1944.   R. H. SAMPSON   2,350,698
ROUNDING OFF MEANS FOR CALCULATING MACHINES
Filed July 15, 1943   5 Sheets-Sheet 4

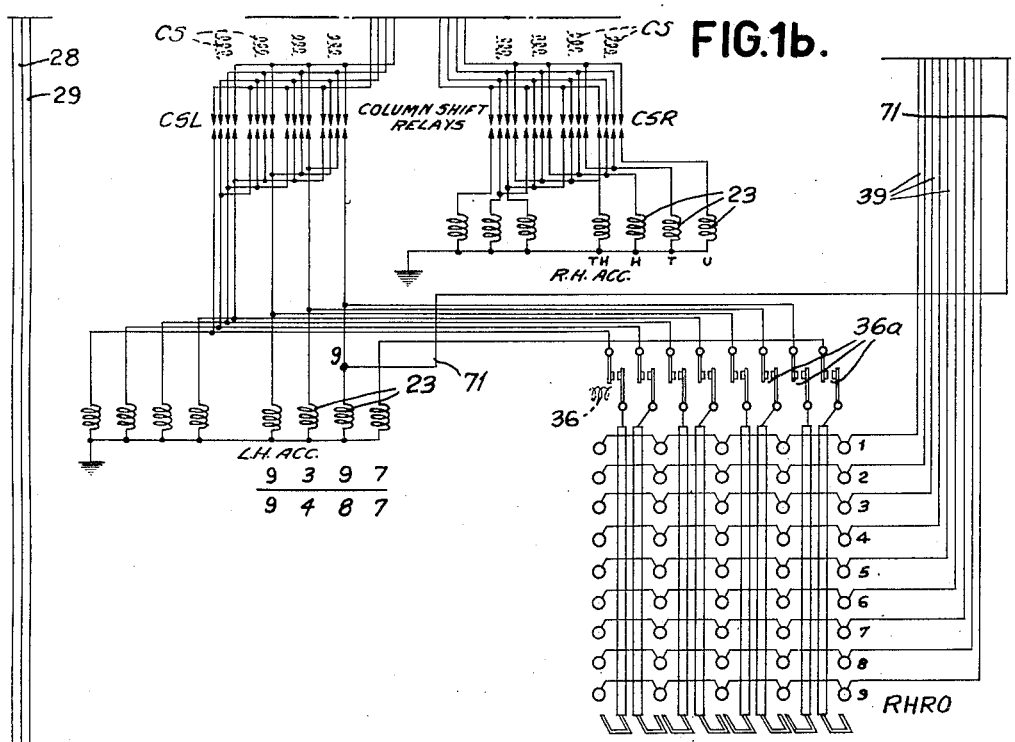
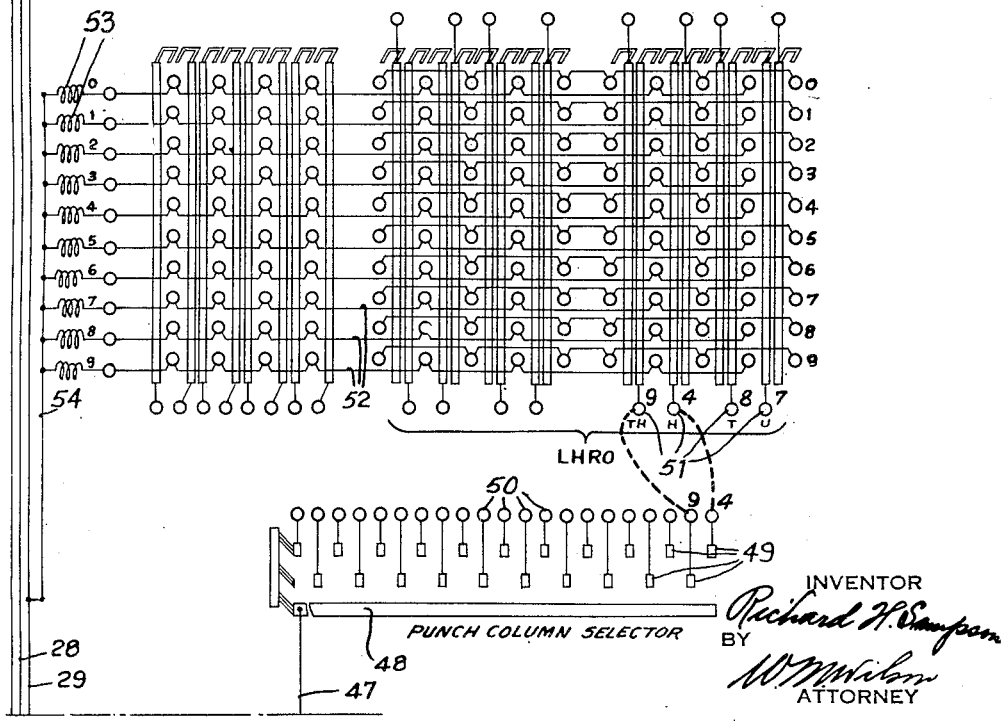

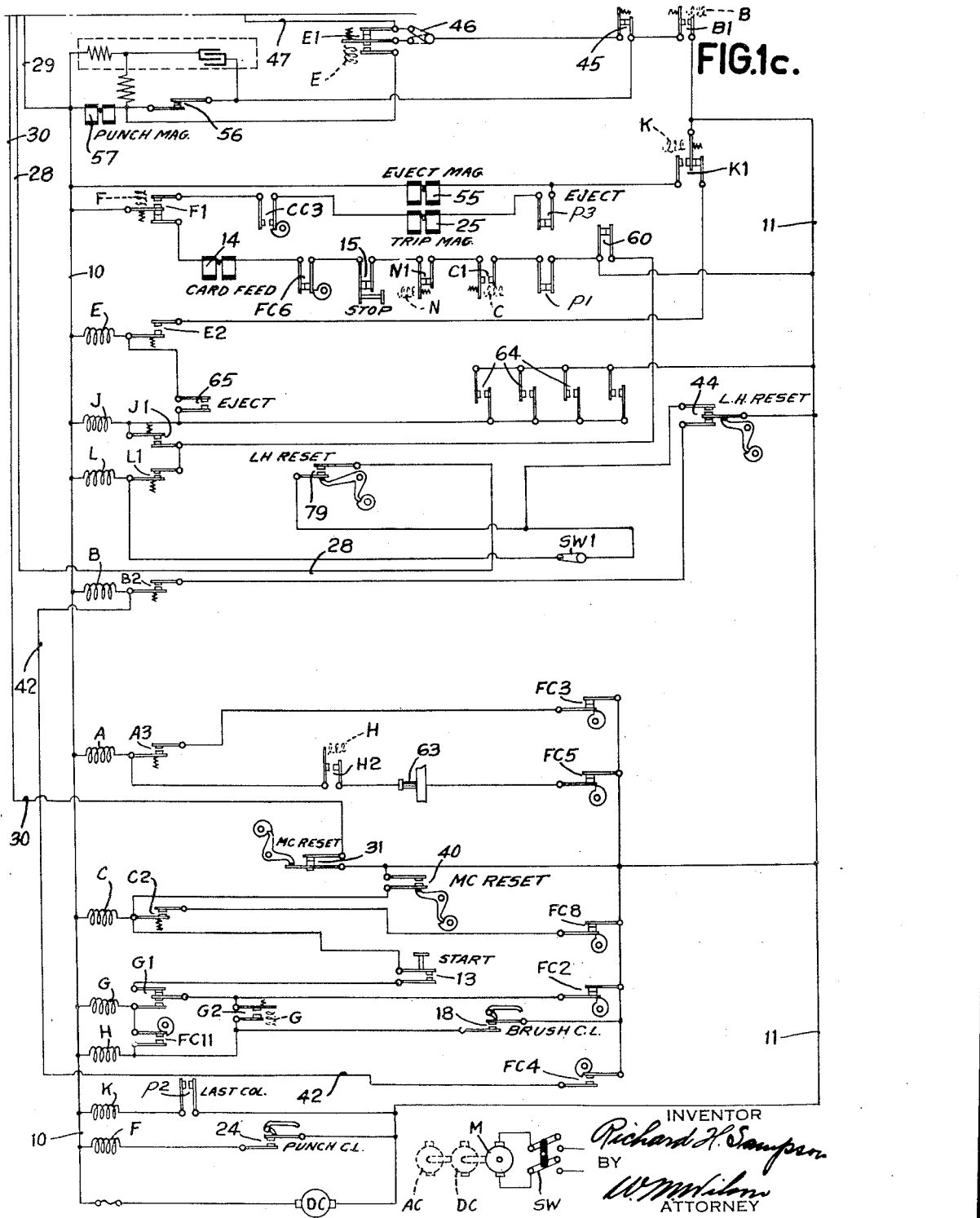

|  | | | | | |
|---|---|---|---|---|---|
| NO ADJUSTMENT | 9307 | 9317 | 9327 | 9337 | 9347 — ENTERED IN RH |
|  | 0 | 1 | 2 | 3 | 4 — ENTERED IN LH |
|  | 93⓪⑦ | 93②⑦ | 93④⑦ | 93⑥⑦ | 93⑧⑦ |
|  | 93 | 93 | 93 | 93 | 93   PUNCHED |
| ADJUSTMENT TO NEAREST CENT | 9357 | 9367 | 9377 | 9387 | 9397 — ENTERED IN RH |
|  | 5 | 6 | 7 | 8 | 9 — ENTERED IN LH |
|  | 94⓪⑦ | 94②⑦ | 94④⑦ | 94⑥⑦ | 94⑧⑦ |
|  | 94 | 94 | 94 | 94 | 94   PUNCHED |

INVENTOR
Richard H. Sampson
BY
ATTORNEY

Patented June 6, 1944

2,350,698

UNITED STATES PATENT OFFICE 2,350,698

ROUNDING OFF MEANS FOR CALCULATING MACHINES

Richard H. Sampson, Plainfield, N. J., assignor to International Business Machines Corporation, New York, N. Y., a corporation of New York Application July 15, 1943, Serial No. 494,809

3 Claims. (Cl. 235—61.6)

The present invention relates to "rounding off" devices for calculating machines which are also known as "½ cent pickup," etc.

For a better understanding of the function performed by the rounding off device, it is to be understood that in securing the result of a computation a number of digits are secured and it is the universal practice to disregard the figures appearing below a certain order or place. However, in some accounting systems in making out computations according to the U. S. currency system the dollars position may be of material consequence and in others, the dimes, the cents, or the mills place. It is frequently desirable that this particular order be adjusted by a unit and it is the object of the present invention to provide a novel rounding off mechanism which will automatically add an increment of the digit itself in a lower order to increase by a unit the next higher order when such lower order represents the digits 5, 6, 7, 8 or 9.

The main object of the invention is to provide a rounding off means for a selected accumulator order by doubling the digit representation of the next lower order to cause by the customary units carry mechanism a unit carry to the next higher order in the event that such doubling of the digit causes the lower order to pass from 9–0.

A still further object of the invention is to utilize a simple means usually already incorporated in calculating machines whereby such means can effect the rounding off operation without the use of extraneous devices which are auxiliary to the customary calculating means.

More specifically the above object is attained by effecting the entry of the digit in a result accumulator twice to double the digit representation in this order.

In the present machine a computation is effected to enter a value in one accumulator. Concurrent with this entry a supplemental result accumulator receives the entry of a digit of the same value in the order used to control the rounding off operation. Subsequently there is a transfer to the result accumulator of the amount in the other accumulator and as a result of such transfer the digit in the order used to control rounding off is doubled in the result accumulator.

The rounding off operations effected herein provides for the same result as in previous rounding off devices where an auxiliary device is usually utilized to enter a "5" in a selected order. In the present case the auxiliary "5" entry device is not utilized, the doubling of the digit automatically effecting rounding off as is required.

The elimination of such extraneous devices permits rounding off operations to be incorporated in many computing machines without radical changes or the incorporation of auxiliary devices. When machines are already provided with such auxiliary devices and are in use, the present arrangement is an efficient auxiliary.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1a, 1b, and 1c, taken together and placed one above the other in the order named, constitute a wiring diagram of the electric circuits of the machine.

Before explaining the manner in which the machine operates in the performance of its special functions, a brief explanation will be given of the manner in which the apparatus operates in performing simple multiplying operations.

The mechanical structure of the machine is substantially the same as that of Patent No. 1,933,714, granted November 7, 1933, to J. M. Cunningham, and in Patent No. 1,944,665, granted January 23, 1934, to D. J. Oldenboom.

After record cards bearing perforations representative of the factors to be multiplied have been placed in the feed magazine of the machine and after the various preliminary plug connections have been made for directing the entries into the accumulators, the main line switch SW (Fig. 1c) is closed, which places the motor M in operation. The motor M drives the A. C.—D. C. generator, indicated at AC and DC, Figs. 1a and 1c, respectively. The D. C. portion of the generator supplies current to D. C. lines 10 and 11 (Fig. 1c) and the A. C. commutator supplies current to ground and to a line 12. The start key contacts 13 (Fig. 1c) are now closed by depression of the start key button, which completes a circuit from the D. C. line 10, through a relay coil C, contacts 13 (now closed), upper contacts G1, cam contacts FC2, to line 11. The coil C establishes a holding circuit through its contacts C2 and cam contacts FC8.

Figure 1A:
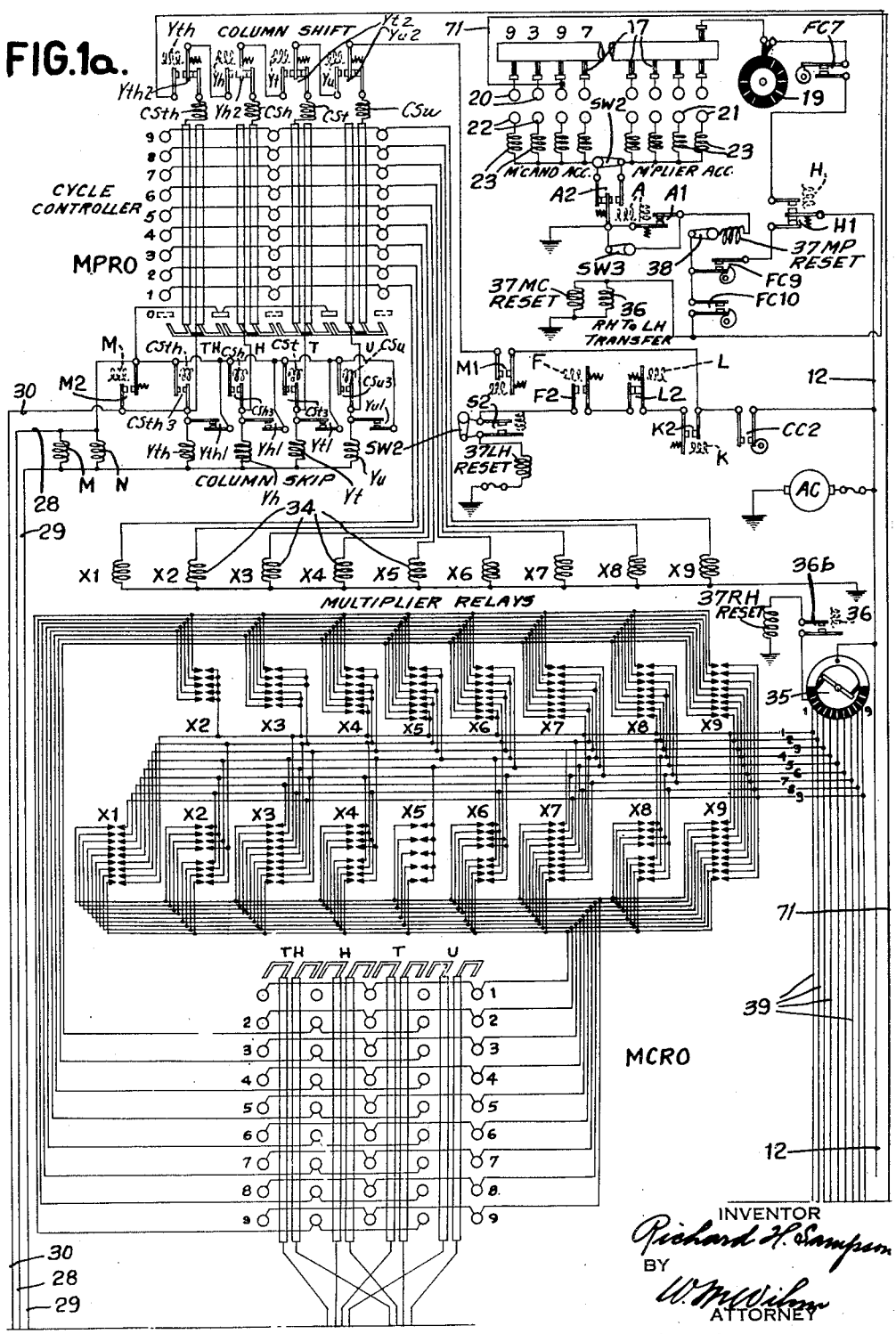

The coil C, when energized, also closes a pair of contacts C1, which will complete a circuit from line 10, normally closed relay contacts F1, card feed clutch magnet 14, cam contacts FC6, stop key contacts 15, relay contacts N1, contacts C1, a pair of contacts P1, to line 11. Energization of card feed clutch magnet 14 will cause withdrawal of a card from the magazine and will advance the card to the analyzing brushes 17 (Fig. 1a). During this movement of the card, the usual card lever is engaged to close card lever contacts 18 (Fig. 1c), which complete a circuit from line 11, contacts 18, relay magnet H, to line 10.

In starting up the machine, it is necessary to hold down the start key to maintain the contacts 13 closed during the first complete card feeding cycle, or alternatively, to depress the start key a second time. At the beginning of the second card cycle, the closure of cam contacts FC11 will energize relay magnet G through a circuit including card lever contacts 18. Relay magnet G will close its normally open contacts G1, setting up a holding circuit through cam contacts FC2 and will also close relay contacts G2 to provide a further holding circuit through the card lever contacts 18. These two holding circuits alternate in maintaining the relay magnet G energized as long as cards continue to feed from the magazine. The relay magnet H is also provided with a holding circuit which extends through card lever contacts 18 or serially through relay contacts G2 and cam contacts FC2.

Energization of relay magnet H will cause shifting of its contacts H1 (Fig. 1a) to the reverse of the position shown, thereby supplying current to the impulse distributor 19 which supplies current to the analyzing brushes 17 and as the card proceeds to pass the analyzing brushes, circuits will be completed to the accumulators selected to receive entries in accordance with the perforations in the record card; that is, as the card traverses the brushes 17, the multiplier factor will be entered into the multiplier accumulator and the multiplicand factor will be entered into the multiplicand accumulator. The entering circuits extend from the A. C. generator, through line 12, to the now closed contacts H1, cam contacts FC7, distributor 19, to the brush contact roll. The card passes between the contact roll and brushes 17.

From the contact roll the circuits extend through the perforations in the card, the brushes 17, to plug sockets 20, from which suitable plug connections are made to sockets 21 and sockets 22 of the multiplier and multiplicand accumulators, respectively, to effect energization of the entry control magnets 23 of the related accumulators. The entering circuit, after passing through the magnets 23, continues through normally closed contacts A2 to ground.

After the first card has traversed the brushes 17 it is fed into the punching unit of the machine and upon its arrival there, it causes closure of punch card lever contacts 24 (Fig. 1c) which cause energization of the relay magnet F. The closure of the normally open contacts F1 establishes a circuit from line 10, now closed contacts F1, cam contacts CC3, trip magnet 25 of the punching unit which functions to trip clutch mechanism to further advance the card to punching position. The circuit continues through eject contacts P3 and relay contacts K1, which at this time are in the position reverse to that shown. The contacts K1 are controlled by relay magnet K which is energized through last column contacts P2 in the punching unit. These so-called last column contacts close whenever the card advancing carriage of the punching unit is in last column punching position, which position it occupies when the operation of the entire machine is first started so that upon starting, relay K is energized and its contacts K1 are in shifted position.

Relay F also closes a pair of contacts F2 (Fig. 1a) which complete a circuit from line 12, cam contacts CC2, contacts K2, L2, F2, switch SW2, reset magnet 37LH to ground.

Energization of magnet 37LH causes resetting of the LH accumulator which receives the left hand components of the product and the purpose of resetting it at this time is to prepare for multiplication of the factors on the first card. As this accumulator is reset, contacts 44 (Fig. 1c) close, establishing a circuit from line 11, upper contacts 44, switch SW1, relay magnet L to line 10. Relay magnet L closes its contacts L1 to provide a holding circuit through the usual punch feed rack contacts 60 which is maintained until the next card is fed from the feed hopper of the punching unit and contacts 60 opened. These contacts correspond to contact 167a of the Cunningham patent. Relay magnet L also opens its contacts L2 (Fig. 1a) thus preventing further resetting of the LH accumulator for such period.

The cards are handled in the card punching unit in the customary manner as set forth in the above mentioned patents. After the analyzed card has been advanced column by column in the punching unit and the left hand component accumulator LH is being reset a circuit is completed which extends from line 11 (Fig. 1c), contacts 44 and 79 which are closed while the LH accumulator is resetting, wire 28 (Figs. 1b and 1a), through relay magnets M and N in parallel, wire 29 (Figs. 1b and 1c), to line 10. Relay magnet M closes its contacts M2 (Fig. 1a) to provide a holding circuit for the relays extending from line 10, wire 29, relays M and N, contacts M2, wire 30, to the normally closed contacts 31 (Fig. 1c) and line 11. Contacts 31 are opened during the operation wherein the MC accumulator is reset and until such time, relay magnets M and N will remain energized. These are the master relay magnets of the cycle controller unit and they call the cycle controller into operation to determine the location of significant figures in the multiplier.

The circuit through wire 28 also extends to the zero segments of the readout unit of the multiplier accumulator designated MPRO. If any of the brushes of the MPRO stand at zero, selected ones of the column skip magnets Y$u$, Y$t$, Y$h$, etc., will be energized according to which denominational orders of the multiplier contain zeros. The magnets Y$u$, Y$t$, Y$h$, etc., control contacts Y$u$-2, Y$t$-2, Y$h$-2, etc., through which circuits are completed to the column shift relay magnets CS$u$, CS$t$, CS$h$, etc., and to the multiplying relay magnets 34. In those positions in which the multiplier digit is zero, the associated magnet Y$u$, Y$t$, Y$h$, etc., will be energized and the related contacts Y$u$-2, Y$t$-2, Y$h$-2, etc., will be shifted from the position shown in the diagram so that the related magnet CS$u$, CS$t$, CS$h$, etc., will be disconnected from the circuit which is traceable from line 12, cam contacts CC2, relay contacts M1, normally closed contacts Y$u$-2, Y$t$-2, Y$h$-2, etc., relay magnet CSu, CSt, CSh, etc., through the appropriate readout spot in one order of the readout section MPRO, to the corresponding relay magnet 34, and thence to ground. The function of the contacts Yu-2, Yt-2, Yh-2, etc., is to direct the multiplying relay selecting circuits through only those positions in which significant figures occur in the multiplier and to skip the positions in which zeros occur. The usual holding contacts Yu-I, Yt-I, Yh-I, etc., are provided to maintain their related magnets Yu, Yt, Yh, etc., energized. With a particular magnet 34 energized, for example the X5 magnet 34, the related contacts shown in the center of Fig. 1a will become closed and with the emitter 35 in constant operation impulses will be emitted through the contacts of the times 5 multiplier relay 34 and thence through the readout device of the multiplicand accumulator designated MCRO and thereafter through the column shift relay contacts CSL and CSR (Fig. 1b) to the entry control magnets 23 of the RH and LH accumulators which thus receive the right and left hand partial product entries.

The CSL and CSR relay contacts are controlled by the relay magnets CSu, CSt, CSh, etc., and serve to effect the proper denominational allocation of the partial product entries. Thus, when multiplying is being effected by the units digit of the multiplier, the units magnet CSu is energized and the units order set of contacts CSL and CSR are closed.

Energization of a relay magnet CSu, CSt, CSh, etc., (Fig. 1a) will also close a pair of contacts CSu3, CSt3, CSh3, etc., which will cause energization of the relay magnet Yu, Yt, Yh, etc., in the order in which multiplying is taking place. This in turn will shift the related pair of contacts Yu-2, Yt-2, Yh-2, etc., so that when cam contacts CC2 again close, the aforetraced circuit will be directed through the magnet CSu, CSt, CSh, etc., in the order containing the next higher significant figure and will skip the magnets CS in positions in which zeros are present.

The machine continues multiplying operations during which the partial products are entered in succession into the LH and RH accumulators. After a multiplying cycle has been effected for each significant multiplier digit, all of the magnets Yu, Yt, Yh, etc., will have been energized and all of the contacts Yu-2, Yt-2, Yh-2, etc., will be in their shifted positions so that on the next following cycle the closure of cam contacts CC2 will complete the circuit which extends through all of the now closed contacts Yu-2, Yt-2, Yh-2, etc., to the relay magnet 36 and the multiplicand reset magnet 37MC. A parallel circuit also extends through cam contacts FC10 and multiplier reset magnet 37MP. If switch 38 is open, the multiplier accumulator will not be reset and the factor therein will become a so-called "fixed" multiplier for succeeding multiplying operations.

The relay magnet 36 closes its contacts 36a (Fig. 1b) which connect the readout section of the RH accumulator, designated RHRO, to the entry control magnets 23 of the LH accumulator, thus transferring the sum of the right hand partial products into the LH accumulator to produce the complete product. These circuits are controlled from the emitter 35 through a group of wires generally designated 39 which extend to the readout device RHRO.

Figures 2, 3:
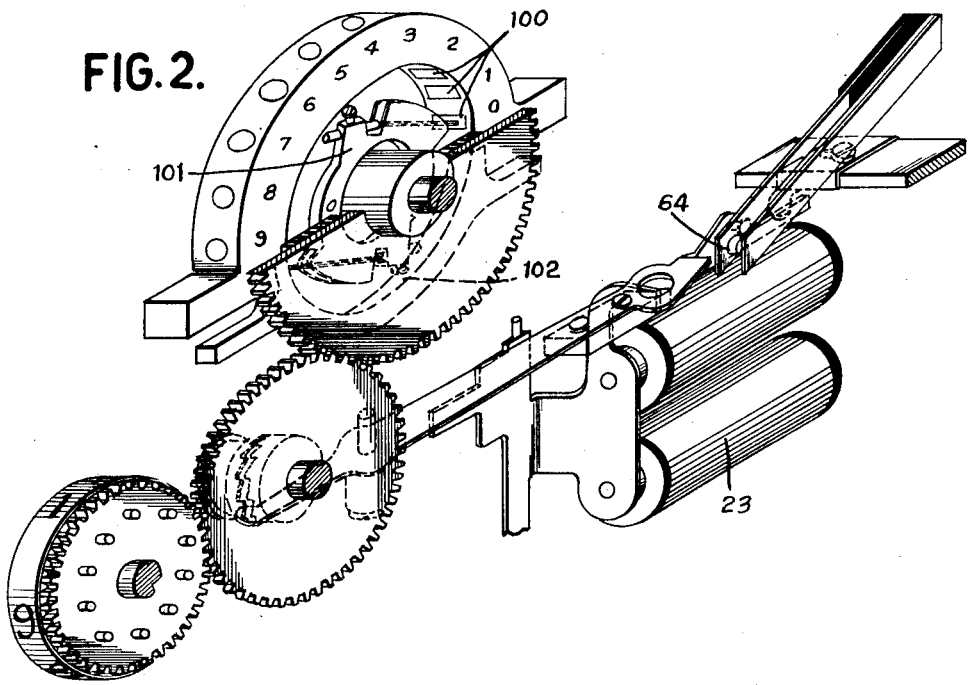
Fig. 2 is a detail in isometric of an order of one of the accumulators.
Fig. 3 is a diagrammatic representation of a series of the problems which the mechanism is designed to perform.
Figure 4:
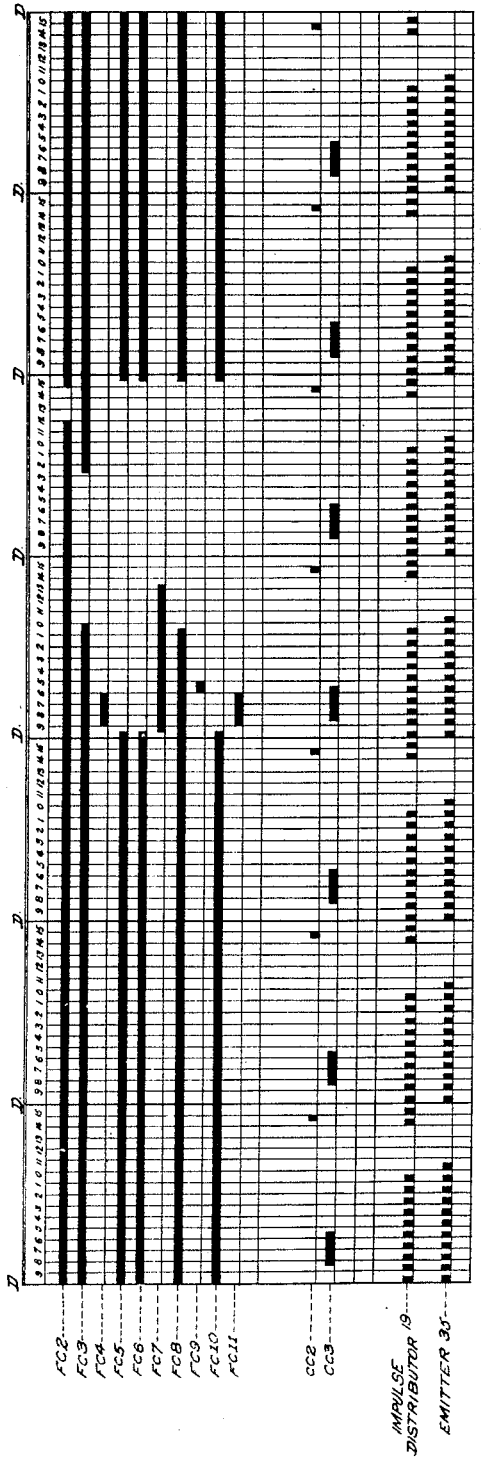
Fig. 4 shows the timing of circuit closing devices.

In Fig. 2 is shown a section of an accumulator to illustrate the mechanical arrangement of the readout section which is the same for all the accumulators except in the number of commutator segments provided. For each order there are commutator segments 100 which are electrically connected through the brush structure 101 to the common arcuate conducting strip 102. The position of the brush corresponds to the value entered on its associated accumulator and connects the segment 100 having such value to strip 102. In the circuit diagram, the segments and strips are represented as circles and vertical bars respectively.

During the cycle in which the MC accumulator is reset concurrently with the RH to LH transfer operation, the normally closed contacts 31 (Fig. 1c) which are operated by a cam on the MC reset shaft will open to interrupt the circuit to the cycle controlling relay magnets Yu, Yt, Yh, etc., thus causing deenergization of all these magnets and the interruption of their related circuits.

The RH to LH transfer relay magnet 36 closes a pair of contacts 36b (Fig. 1a) through which a circuit is completed by the emitter after the amount in the RH accumulator has been transferred to the LH accumulator. This circuit is traceable from line 12 through emitter 35, which, when the brushes are at the zero segment, will continue through contacts 36b to the reset magnet 37RH which functions to initiate resetting of this accumulator.

Referring now to Fig. 1c, the contacts 40 are closed along with the shifting of contacts 31 when the MC accumulator is resetting, thereby completing a circuit from line 11, contacts 40, relay magnet C, to line 10. Relay magnet C establishes a holding circuit through contacts C2 as before and also closes contacts C1 to complete the circuit through the card feed clutch magnet 14 as traced above. This causes the next card to be fed to the analyzing brushes where the new factors will be entered into the accumulators and in the case of fixed multiplier operation, wherein the multiplier accumulator is not reset, only a multiplicand factor will be entered into the MC accumulator in preparation for the next series of multiplying operations.

During the operation of card feeding, the cam contacts FC4 close, completing a circuit from line 11, contacts FC4, thence through a wire 42 to relay B and to line 10. Energization of magnet B will close its contacts B2 to provide a holding circuit through normally closed contacts 44 associated with the reset devices of the LH accumulator. The magnet B will also close its contacts B1, thereby establishing a circuit from line 11, contacts B1, contacts 45 in the punching unit, switch 46, wire 47 (see Fig. 1b) to the common conducting strip 48 of the punch column selector. The strip 48 is connected in succession to the segments 49 as the record card moves step by step past the column of punches in the punching unit and in those columns which are plug connected to the readout device LHRO will complete circuits from segments 49 to sockets 50, thence through plug connections to sockets 51 and through the LHRO device to wires 52 which extend to the punch selecting magnets 53 whose common return wire 54 extends to line 10 through wire 29.

While the step by step punching of the product takes place in the card, the new factors are entered into their appropriate accumulators and when the card is completely punched and advanced to its last column position, relay K will be energized as before to close its normally open contacts KI and complete a circuit through the eject magnet 55, which ejects the punched record from the machine.

As explained in the above mentioned patents, the energization of any of the magnets 53 will advance a related interposer into operative relationship with a corresponding punch and the advancement of any interposer will cause closure of a pair of contacts 56 (Fig. 1c) which complete a circuit from line 10, through the punch magnet 57, contacts 56 and BI, to line 11. The punch magnet serves to press the interposer against the selected punch to effect a perforation in the corresponding position in the card column. The feeding of the new card to the brushes will again cause closure of the card lever contacts 18, causing energization of magnet H to permit the impulse distributor 19 to supply current to the card analyzing brushes 17.

The operation of the machine as thus far described is substantially the manner in which multiplying operations are performed in the patents referred to and in commercial machines.

The operations as outlined relate to so-called "individual multiplication" wherein a pair of factors are read from each card and the product is punched back into the separate cards.

This type of machine is also designed for what is known as "group multiplication" in which the multiplication of a multiplicand factor on each card is effected by a common multiplier factor carried by a so-called rate card. The changes in operation for this type of functioning will now be briefly reviewed.

When starting a run of group multiplication, the first rate card (bearing only the multiplier factor) is preceded by a blank card bearing only an "X" punching in a preselected column. The machine is started as above and the H relay energized to close its contacts H2 (Fig. 1c) so that when the brush 63 senses the "X" hole, a circuit will be completed from line 11, cam contacts FC5, brush 63, contacts H2, relay A to line 10. Relay A closes its contacts A3 to provide a holding circuit through contacts FC3. Switch SW3 (Fig. 1a) is open for this operation and closure of contacts AI will complete a circuit from line 12, contacts CC2, now closed contacts MI, normally open contacts Yu-2, Yt-2, Yh-2, etc. in series, contacts FC10, switch 38, magnet 37MP, contacts AI to ground. This circuit will, of course, not be completed until all the Yu-2, Yt-2, etc., contacts have been closed as explained. The MP accumulator is accordingly cleared in readiness to receive the multiplier from the following rate card. Relay magnet A also closes a pair of contacts A2 which control the entry of the rate into the MP accumulator from the record card. Switch SW2 is open (Fig. 1a) and shifting of contacts A2 connects the entry magnets 23 of the multiplier accumulator to ground during the passage of the rate card by the analyzing brushes 17. Thereafter magnet A becomes deenergized and remains so until another "X" hole is sensed by brush 63.

As the multiplier factor is read into the MP accumulator, so-called list contacts 64 (Figs. 1c and 2) are closed in each order in which a significant entry is made.

Closure of any contact 64 will complete a circuit from line 11, contacts 64, relay magnet J to line 10, and a holding circuit will be established by contacts J1 through contacts 60. After the relay J is energized and when eject contacts 65 close upon completion of product punching, a circuit is completed from line 11, contacts 60, JI, 65, relay E to line 10, which circuit is held through contacts KI and E2. For this operation, switch 46 is in its dotted line position and the effect of energizing relay E is to prevent punching in the rate card and to cause its advance through the punching machine. Closure of lower contacts EI will cause repeated energization of the punch magnet 57 to cause such advance, the circuit being traceable from line 11, contacts BI, 45, switch 46, lower contacts EI, magnet 57 to line 10.

The manner in which the standard multiplying punch has been modified to handle the problems illustrated in Fig. 3 will now be set forth.

It is common commercial practice to augment a selected order of an accumulator by a unit when the next lower order of the accumulator represents five or more. The computations outlined in Fig. 3 represent computations made to determine the amount due for Social Security taxes upon wages or salaries derived and represented on cards passing through the machine. This computation is preferably carried out in the multiplying machine shown as part of a dual multiplying computation, that is, multiplication effected to determine the Social Security taxes due at a one percent rate and a Victory tax computation at a five percent rate. The arrangement in the machine for carrying out the additional Victory tax computation is not shown since it forms no part of the present invention. However, this explanation is made to point out that the multiplying computation at the one percent rate for the present Social Security tax is useful alone and as part of the dual computation.

As previously explained, the tabulating cards successively passing through the multiplying machine represent the wages or salaries to be paid to the workers represented on such cards. From this value, there is to be deducted the Social Security tax computed at the one percent rate. The rate of multiplication is the multiplier digit value which is entered in the MP accumulator. The MP digit may be selectively derived from various sources, for example, it may be derived from the tabulating card itself and entered in the MP accumulator for "individual multiplication." Alternatively by conditioning the machine as previously explained for what is known as "group multiplication" the common multiplying factor may be derived from the first "X" punched rate card which precedes the successive cards bearing the representation of the wages or salaries. Furthermore, by suitable connections the multiplier digit value may be permanently set up in the machine by causing the continuous energization of the "X" multiplier relays and, of course, for multiplication by the MP digit value "1," the XI multiplier relay is maintained energized.

Of course, the augmenting of the digital value may be effected in any selected order and in the present case the digital value of the hundreds or dollars order is augmented in accordance with the digital values of the tens or dimes digit. The augmenting of the dollars order will, when one percent is taken of the dollars amount, augment the order recorded as cents. A decimal recording of the value in the LHRO readout is effected by establishing plug connections only between the plug sockets of the hundreds and thousands order of LHRO and the selected plug sockets 50 of the punch column selector for the units and tens card columns of a field so that by such decimal recording the cents and dimes digital values will be punched on the tabulating card to represent the Social Security tax due. Hence, by augmenting the dollars order in the original entry the recorded cents order of the tax value is adjusted and which adjustment is required by law whenever the dimes value of the wages or salaries due represents 5, 6, 7, 8, or 9.

The augmenting of a selected order of an accumulator by a unit when a lower order represents "5" or more is, in the present machine, effected by a wire connection 71 from the brush 17 of the tens order of the MC analyzing brushes which wire connection 71 extends as shown in Figs. 1a and 1b to the tens order accumulator control magnet 23 of the LH accumulator. Hence, in concurrently entering the MC value, or the amount representing the wages and salaries in the MC accumulator, there is a concurrent entry of the tens digit in the tens order of the LH accumulator. In multiplying computations by the MP digit value "1," the MC value is entered in the RH accumulator as such amount and, of course, is represented in the RHRO readout. The amount in RHRO is then transferred to the LH accumulator. Since the tens order of RHRO represents the same digital value as the tens order of the LH accumulator this transfer, broadly speaking, causes the doubling of the digital value of the tens order in the result accumulator LH. There is illustrated in Fig. 3 a number of examples which indicate the effect of doubling of the digit in this manner. In the selected example it is assumed that only the dimes value varies from zero to nine and obviously when the dimes digit represents 0, 1, 2, 3, and 4 the doubling of such digit in the manner just explained does not cause the tens order of the LH accumulator to effect a unit carry to the hundreds or dollars order of the LH accumulator. However, as shown in the examples for the bottom line of Fig. 3, whenever the dimes digit or tens order represents 5, 6, 7, 8, or 9, doubling of this digit causes the tens order of the LH accumulator to pass from nine to zero and thus augment the dollars order by a unit. It is obvious from the bottom line of the examples in Fig. 3 that in each of such instances, the dollars order is augmented by a unit and when the tax is recorded on the tabulating card in the dimes and cents order, the cents order will be shown adjusted.

To illustrate the present invention, it is assumed that the augmenting of a dollars order is effected but it is possible to have the wire connection 71 made so that any selected lower order may be the control order for augmenting the next order when the lower order represents 5, 6, 7, 8, or 9. It is well within the disclosure of the present invention to provide, for example, the wire connection between the units order of the MC analyzing brushes 17 and the unit order of the LH accumulator control magnet 23. Hence, in this order, there would be a doubling of the original digit. A selective arrangement may be conveniently provided for by selective plug connections established between the plug sockets 20 of the MC analyzing brushes and plug sockets connected to the LH accumulator magnets 23. These plug connections may be made on an external plugboard to provide a convenient selection by the operator. Of course, the plug connections between plug sockets 50 and 51, (Fig. 1b) may be changed in accordance with the desired form of recording and certain columns of LHRO may be suppressed for recording or all columns may be utilized for recording on the result card depending upon the accounting system in vogue.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. An accounting machine in which rounding off is to be effected in a selected order comprising, an accumulator having units carry mechanism for carrying a unit to a higher order element when the next lower order element passes from 9–0, entry determining means, means for causing under control of said entry determining means the entry of a value in said accumulator, and means for effecting the entry in a selected lower order element of said accumulator of the same digit entered by the related order of the aforesaid entry determining means whereby the doubling of the digits 5, 6, 7, 8, or 9 in such selected order element of the accumulator causes the units carry mechanism for the next higher order to operate to augment the digit representation in the next higher order element by "1."

2. An accounting machine in which a selected order is to be rounded off comprising an accumulator provided with a units carry mechanism for carrying a unit to a higher order element when the next lower order element passes from 9–0, entry determining means for said accumulator, means for causing under control of said entry determining means the entry of a value in said accumulator, and supplemental means under control of a selected order of said entry determining means for additionally entering the digit determined thereby in the related order element of said accumulator, whereby said related order element upon receiving the double entry of the digits 5, 6, 7, 8 or 9 causes the operation of the units carry mechanism for the next higher order element of the accumulator, whereby such order element of the accumulator is augmented by "1."

3. An accounting machine in which a selected order is rounded off comprising, a result accumulator which is provided with units carry mechanism to carry a unit to a higher order element when the next lower order element passes from 9–0, a supplemental accumulator, entry determining means, means under control of said entry determining means to enter a value in the supplemental accumulator, supplemental means under control of a selected order of said entry determining means to effect the entry of the digit in a selected order element of the result accumulator which corresponds to the same digit entry of the related order element of the supplemental accumulator, means to transfer the digit representation from the supplemental accumulator to the result accumulator whereby the doubling of the digit representation in a selected order element causes when the digits 5, 6, 7, 8 or 9 are doubled the operation of the units carry mechanism under control of such order element to augment by "1" the next higher order element of the result accumulator.

RICHARD H. SAMPSON.